United States Patent
Durga et al.

(10) Patent No.: US 6,813,498 B1
(45) Date of Patent: Nov. 2, 2004

(54) APPARATUS, METHOD AND SYSTEM FOR DETECTION AND RECOVERY OF MISSING WIRELESS DEVICES IN COMMUNICATION SYSTEMS

(75) Inventors: Visweswararao Durga, Wheaton, IL (US); Saeid Sharifian, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 470 days.

(21) Appl. No.: 09/698,577

(22) Filed: Oct. 27, 2000

(51) Int. Cl.[7] .............................. H04Q 7/20; H04Q 7/32
(52) U.S. Cl. ................ 455/456.1; 455/456.2; 455/456.3; 455/456.4; 455/456.5; 455/456.6; 455/457; 340/568.1; 340/572.1; 340/7.21; 340/7.22; 342/357.07; 342/357.09
(58) Field of Search ..................... 455/456.1, 456.2, 455/456.3, 456.4, 456.5, 456.6, 457, 404.1, 404.2, 403, 422.1, 432.1, 426.1, 433, 435.1, 447, 517, 550.1, 552.1, 556.1, 556.2, 574, 343; 340/568.1, 572.1, 7.21, 7.22, 7.26, 5.39, 825.49; 342/357.01, 357.07, 357.09, 357.12

(56) References Cited

U.S. PATENT DOCUMENTS

| | | | | | |
|---|---|---|---|---|---|
| 5,418,537 A | * | 5/1995 | Bird | ...................... | 342/357.07 |
| 5,432,841 A | * | 7/1995 | Rimer | ..................... | 455/456.1 |
| 5,731,785 A | * | 3/1998 | Lemelson et al. | ..... | 342/357.07 |
| 5,748,084 A | * | 5/1998 | Iskoff | ......................... | 340/568 |
| 2002/0034953 A1 | * | 3/2002 | Tricarico | ................. | 455/456.1 |

* cited by examiner

Primary Examiner—William Trost
Assistant Examiner—Keith Ferguson (57) ABSTRACT

Apparatus, method and system embodiments are illustrated which provide for detection and recovery of missing wireless devices in communication systems. The preferred system embodiment includes a mobile switching center, an adjunct network entity, a base station, and a mobile unit, such as a cellular telephone or a wireless personal digital assistant. The adjunct network entity, such as an intelligent network server, has a detection and recovery application for determining, when a mobile unit is missing, a recovery identification and a recovery channel for the missing mobile unit. The mobile switching center then transmits a recovery page to the mobile unit via the base station, in which the recovery page includes information specifying the recovery identification and the recovery channel. The mobile unit, upon reception of a recovery page, enters a recovery mode and transmits a recovery signal on the recovery channel, with the recovery signal including the recovery identification. In the preferred embodiment, the recovery signal also includes global positioning system information. In addition, the recovery signal may be utilized to track, locate and recover the missing mobile unit. In the preferred embodiment, the mobile unit in the recovery mode also disables access to or deletes any stored data within the mobile unit.

38 Claims, 3 Drawing Sheets

APPARATUS, METHOD AND SYSTEM FOR DETECTION AND RECOVERY OF MISSING WIRELESS DEVICES IN COMMUNICATION SYSTEMS

FIELD OF THE INVENTION

The present invention relates in general to wireless and wireline communication systems, and more particularly, to an apparatus, method and system for detection and recovery of missing wireless devices in communication systems, such as lost or stolen wireless telephones and personal digital-assistants.

BACKGROUND OF THE INVENTION

With the advent of wireless communication, mobile or wireless devices such as cellular telephones, PCS telephones, wireless personal digital assistants ("PDAs"), portable computers, and other mobile or wireless communication devices, are capable of performing an increasingly wider array of services and are increasingly valuable. In addition to the cost of the mobile or wireless device, such wireless devices are typically utilized to store significant, valuable and/or confidential information, such as trade secret information. For example, various mobile telephones and PDAs store business data such as directories of names, addresses and telephone numbers, including customer or client names and contacts, while other various wireless devices, such as PDAs or portable computers, may also store significant technical data and business plans. In the event one of these devices is lost or stolen, in addition to the cost of the product, significant losses may occur due to the loss of such information or the loss of control over such stored information.

Currently, there are no mechanisms available to detect and recover such lost or stolen mobile devices. For example, when a mobile telephone is lost or stolen, a service provider may discontinue service to the device, but is currently unable to detect the current location of the device and potentially recover the device.

As a consequence, a need remains for an apparatus, method and system to detect and potentially recover lost, stolen or otherwise missing mobile or wireless communication devices. Such an apparatus, method and system should be cost-effective and capable of implementation within current communication systems, and should provide an effective deterrent to the illicit use of such lost, stolen or missing devices. In addition, such an apparatus, method and system should have the capability to recover data stored in mobile or wireless communication devices, and disable user access to such stored data.

SUMMARY OF THE INVENTION

Apparatus, method and system embodiments are illustrated which provide for detection and recovery of missing wireless devices in communication systems. The preferred system embodiment includes a mobile switching center, an adjunct network entity, a base station, and a mobile unit, such as a cellular telephone or a wireless personal digital assistant.

When a mobile unit has been reported to be missing, such as lost or stolen, the adjunct network entity, such as an intelligent network server, which has a detection and recovery application, determines or assigns a recovery identification and a recovery channel for the missing mobile unit. The mobile switching center then transmits a distinctive recovery page to the mobile unit via the base station, in which the recovery page includes information specifying the recovery identification and the recovery channel. In the preferred embodiment, the mobile unit includes a recovery sleep mode for reception of the recovery page when the mobile unit is powered off.

The mobile unit, upon reception of a recovery page, enters a recovery mode and transmits a recovery signal on the recovery channel, with the recovery signal including the recovery identification. In the preferred embodiment, the recovery signal also includes global positioning system information. In addition, the recovery signal may be utilized to track, locate and recover the missing mobile unit, preferably utilizing an enforcement authority, such as a local police department. In the preferred embodiment, the mobile unit in the recovery mode also disables access to or deletes any stored data within the mobile unit, to preserve confidentiality and unauthorized use of such data.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for the detection and recovery of lost or stolen mobile or wireless communication devices. In accordance with the present invention, apparatus, method and system embodiments,are provided for such detection and recovery of lost, stolen or otherwise missing mobile or wireless communication devices. The apparatus, method and system embodiments of the present invention are cost-effective, capable of implementation within current communication systems, and provide an effective deterrent to the illicit use of such lost, stolen or otherwise missing wireless devices. In addition, such apparatus, method and system embodiments of the present invention have the capability to recover data stored in mobile or wireless communication devices, and to disable illicit access to such stored data.

Figure 1:
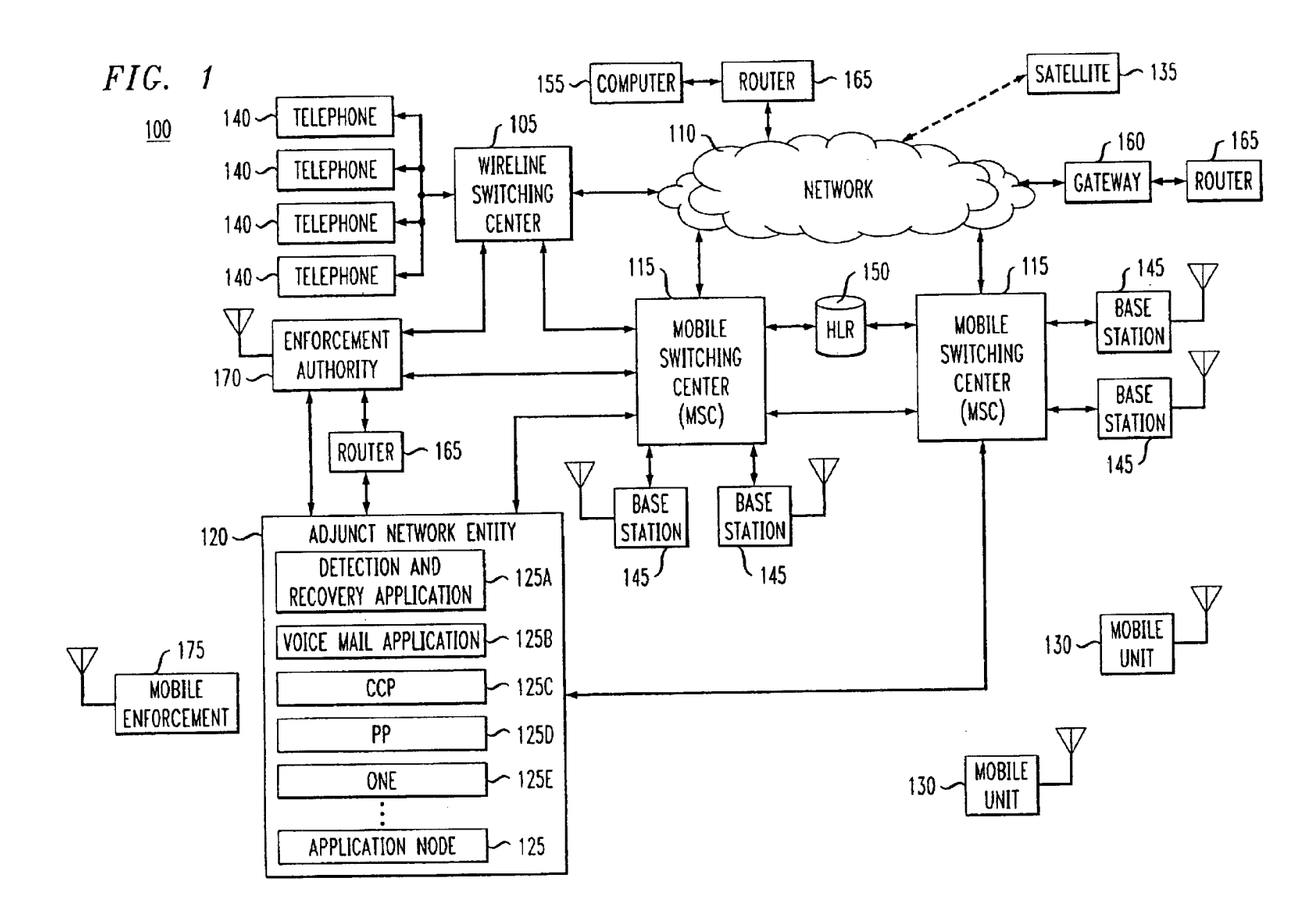
FIG. 1 is a block diagram illustrating a system embodiment to provide for detection and recovery of missing wireless devices in communication systems in accordance with the present invention.

FIG. 1 is a block diagram illustrating a system embodiment to provide for detection and recovery of missing wireless devices in communication systems in accordance with the present invention. The system 100 includes one or more mobile switching centers ("MSCs") 115 and may also include one or more wireline switching centers 105 (collectively "switching centers"), which may also be connected via trunk and signaling lines to each other and to a broader network 110, such as to a public switched telephone network ("PSTN"), with multiple communication connections to other locations, such as providing a link to a satellite 135, which may be one or more communications or global positioning system ("GPS") satellites. The system 100 may also include links to one or more gateways 160 and one or more routers 165, such as for international communication or packet-based communication, such as for Internet connections to one or more computers 155 (or other network communication device).

The wireline switching center 105 is also generally connected to a plurality of telephones 140 or other customer premise equipment, while the MSCs 115 (via base stations 145 or other wireless transceivers) typically have a wireless link to the various mobile units 130 within a particular geographic region, for voice and data communication. The various mobile units 130 may include, for example, cellular or PCS telephones, PDAs, or mobile computers, or other wireless communication or computing devices. Any such mobile unit 130 which has been lost, stolen, or is otherwise missing is referred to herein as a "missing" mobile unit 130. In addition, while the wireline and mobile switching centers 105 and 115 are usually physically separated due to regulatory and other historical reasons, these switching centers may also be combined into one or more switching centers having both wireline and wireless functionalities. Also as illustrated in FIG. 1, a particular type of database, a home location register ("HLR") 150, containing service information for each mobile unit 130 within its assigned geographic region, is separately illustrated as a stand-alone HLR 150; in other embodiments, such HLR functionality may be integrated into any of the mobile switching centers 115 (or wireline switching center 105) (as an integrated home location register ("I-HLR")). In addition, each MSC 115 typically includes another database known as a visitor location register ("VLR") (not separately illustrated).

The system 100 preferably includes one or more intelligent network devices referred to as adjunct network entities 120, such as a database, a service control point ("SCP"), a service circuit node ("SCN") (also referred to as a service node), an intelligent peripheral ("IP"), or another intelligent network server or other device. One or more adjunct network entities 120 are preferably connected or coupled to a wireline switching center 105 and to one or more MSCs 115. In the preferred embodiment, the adjunct network entities 120 provide a node or platform for particular applications, referred to herein as "application nodes" 125, such as the detection and recovery application 125A of the present invention, and other applications such as a voice mail application 125B, a calling party pays application 125C, a prepaid application 125D, a one number service application 125E, and other intelligent network applications. It should be understood, however, that such application nodes 125 are applications or platforms running or operating within adjunct network entities 120, such as within SCPs and SCNs. In the preferred embodiment, the adjunct network entity 120 which implements the detection and recovery application 125A of the present invention is a server or other computer, such as a network server, and may be implemented as a stand-alone server without other applications.

Continuing to refer to FIG. 1, the system 100 is also connected or coupled, via circuit-switched or packet based connections, such as through switching centers 105 or 115, or through adjunct network entity 120 and routers 165, to an enforcement authority 170, such as a police station or other law enforcement office. As discussed in greater detail below, the enforcement authority 170 receives various communications from the system 100 concerning missing mobile units 130, such as location information or tracking information. The enforcement authority 170, in turn, preferably has wireless communication links with mobile enforcement units 175, such as police cars, which may track or locate, and recover, a missing mobile unit 130.

Continuing to refer to FIG. 1, a subscriber or other customer may report to or otherwise inform a service provider that a mobile unit 130 is missing, for example, that a mobile unit has been lost or stolen. In the prior art, the service provider would simply discontinue service to the missing mobile unit 130, so that communications with the missing mobile unit 130 would not be charged to the subscriber's account. The missing mobile unit 130, however, continues to be operational and may be reprogrammed for use elsewhere or with a different service provider. In addition, any stored data within the missing mobile unit, in the prior art, is unprotected. In accordance with the present invention, however, when a service provider has been informed that a mobile unit 130 is missing, a sequence of events is initiated which will enable location and potential recovery of the missing mobile unit 130, which will disable the missing mobile unit 130 from further use, and which will disable access to or destroy, and thereby preserve confidentiality of, any stored data within the missing mobile unit 130.

In accordance with the present invention, when a service provider has been informed that a mobile unit 130 is missing, an MSC 115, typically a "home" MSC 115 for the missing mobile unit 130, transmits a corresponding message to the detection and recovery application 125A within the adjunct network entity 120, which is preferably embodied as an intelligent network server. The message from the MSC 115 to the detection and recovery application 125A identifies the particular missing mobile unit 130 and indicates that it is missing. In response to the message, the detection and recovery application 125A determines a recovery identification and a recovery channel, which the missing mobile unit 130 will use (as discussed below), and transmits a response message to the MSC 115 with the recovery identification and a recovery channel information for the missing mobile unit 130. The MSC 115, or the detection and recovery application 125A, also transmits a message containing the recovery identification and the recovery channel to the enforcement authority 170, for subsequent use in detecting and recovering the missing mobile unit 130.

The MSC 115 then utilizes this information to update its database, such as HLR 150, and provides this information to other (potentially serving) MSCs 115 for their VLR databases. The various MSCs 115 then determine whether the missing mobile unit. 130 is currently registered within any of their corresponding serving areas, i.e., has been powered on and registered within either a home or serving region, or determine whether the missing mobile unit 130 has a recovery sleep mode when powered off. The recovery sleep mode, in accordance with the present invention, allows a missing mobile unit 130 to be powered off but to nonetheless receive and respond to a recovery page, as discussed in greater detail below, with an equivalent effectiveness of being powered on and registered. If the missing mobile unit 130 does not have a recovery sleep mode or has not registered with a MSC 115, the various MSCs 115 will wait for the missing mobile unit 130 to power on and register.

When the missing mobile unit 130 does have a recovery sleep mode or has registered with a MSC 115, the various MSCs 115 transmit, or the serving MSC 115 of its registered location transmits, a new and distinctive "recovery" page to the missing mobile unit 130 in accordance with the present invention. As distinguished from a typical page for locating a mobile unit 130 for an incoming call, this recovery page of the present invention informs the missing mobile unit 130 that it is, in fact, missing (such as lost or stolen), and that it should enter a recovery mode immediately. The recovery page also includes the information previously obtained from the detection and recovery application 125A, namely, the recovery identification and the recovery channel. In the preferred embodiment, the recovery page is transmitted on multiple channels, such as on multiple frequencies or using multiple codes, to increase the likelihood of its reception by the missing mobile unit 130. The recovery page may be implemented in a wide variety of equivalent ways, and for purposes of the present invention, the recovery page should merely be distinctive from any other types of signals and pages transmitted to mobile units 130 by MSCs 115 or base stations 145.

Following reception of the recovery page, the missing mobile unit 130 enters a recovery mode in accordance with the present invention. In the recovery mode, the missing mobile unit 130 blocks or disables access to any stored information. This may be accomplished in any number of ways, such as by requiring a predesignated password (known only to the service provider or lawful owner of the missing mobile unit 130) to access the information, by erasing or otherwise destroying the stored information, or by encrypting the stored data. In addition, depending upon the chosen embodiment, prior to any such erasure or destruction of the stored data, the stored data within the missing mobile unit 130 may be backed up by transmission of the; data to the MSC 115 serving its current location (and which presumably had transmitted the recovery page) and stored in an appropriate database (such as HLR 150).

Also within recovery mode, the missing mobile unit 130 broadcasts a recovery signal, utilizing the recovery identification and the recovery channel specified in the recovery page. For example, the recovery identification may be a predefined sequence or signal to identify and distinguish the particular missing mobile unit 130 from other potentially missing mobile units 130, and the recovery channel may be a specified frequency or code for transmission of the recovery identification. The recovery signal may be implemented in a wide variety of equivalent ways, and for,purposes of the present invention, the recovery signal should merely be distinctive from any other types of signals transmitted from mobile units 130 to MSCs 115 via base stations 145. In the preferred embodiment, the recovery signal also includes GPS information approximately specifying the current location of the missing mobile unit 130. The current location of the missing mobile unit 130 may also be determined by the service provider, such as when the missing mobile unit 130 is within a particular geographic region served by a particular base station 145, through GPS systems, or through other techniques. The recovery signal, in turn, may be detected by the enforcement authority 170, such as through mobile enforcement 175 utilizing a receiver tuned or matched to the designated recovery channel, to directly receive GPS information or otherwise track the recovery signal emitted from the missing mobile unit 130. Through detection of the recovery signal broadcast by the missing mobile unit 130, the missing mobile unit 130 may be detected and potentially recovered by mobile enforcement 175 or another enforcement agency.

In addition, depending upon the chosen embodiment, in the recovery mode the mobile unit 130 may be disabled from actual use for voice, data or multimedia communications, or from other functionality specific to the type of mobile unit 130, such as the functions of a PDA.

As may be apparent from the discussion above, the use of the present invention protects confidential information which may have been stored in a lost or stolen wireless device. In addition, the mere potential for detection and recovery of a missing mobile unit 130 provides an effective deterrent against unauthorized possession or use of the missing mobile unit 130, and serves to minimize any economic value which otherwise might have been gained through any illicit use of the missing, mobile unit 130.

Figure 2:
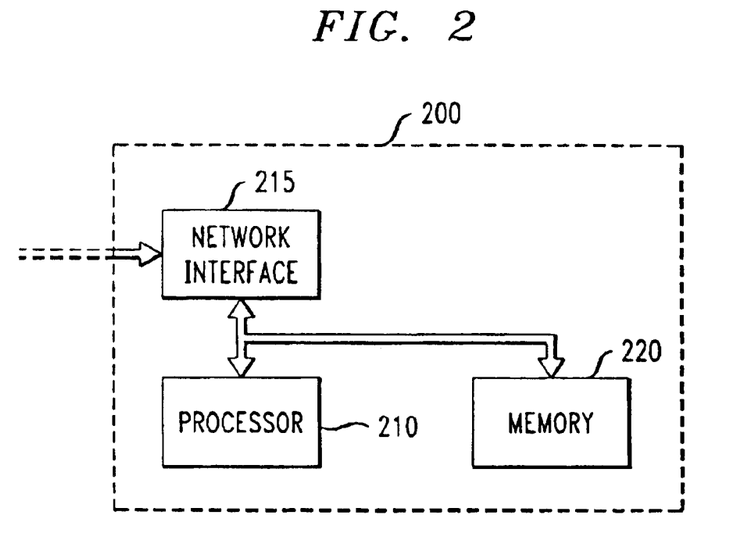
FIG. 2 is a block diagram illustrating a first apparatus embodiment to provide for detection and recovery of missing wireless devices in communication systems in accordance with the present invention.

FIG. 2 is a block diagram illustrating a first apparatus embodiment 200 to provide for detection and recovery of missing wireless devices in communication systems in accordance with the present invention. Such a first apparatus 200 preferably may be included within a mobile switching center 115 (or wireline switching center 105), or distributed among a switching center 115 or 105 and an adjunct network entity 120 of a system 100, to perform the system 100 functions discussed above with reference to FIG. 1 (and discussed further below with reference to FIG. 4).

Referring to FIG. 2, the first apparatus 200 includes a processor 210, a network interface 215, and a memory 220. The network interface 215 is utilized to receive and transmit data, such as a recovery page, the recovery identification and the recovery channel information, voice information, control messages, and other pertinent information and messages, and also may be utilized to receive incoming call legs and transmit outgoing call legs. The network interface 215 is typically coupled through trunk and signaling lines to the various base stations 145 and various adjunct network entities 120. The memory 220 may be one or more integrated circuits (such as various forms of RAM), a magnetic hard drive, an optical storage device, or any other type of data storage apparatus. The memory 220 is used to store information pertaining to a recovery page, the recovery identification and the recovery channel information, call management and other call information, subscriber profiles, and also program instructions or configurations (discussed below). The memory 220 performs such information storage, and may be included within a database (such as a HLR or VLR, which may be stand-alone (such as HLR 150) or integrated (I-HLR) within a switching center 115 or 105), or may be included as other platforms within adjunct network entities 120.

Continuing to refer to FIG. 2, the processor 210 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIG. 1, and also discussed in detail below with reference to FIG. 4, with associated memory, such as microprocessor memory or additional RAM, DRAM, SRAM, MRAM, ROM, EPROM or $E^2$PROM. The processor 210 with its associated memory may be configured (via programming or hard-wiring) to perform the methodology of the invention, as discussed above with reference to FIG. 1 and as discussed below with reference to FIG. 4. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 210 is implemented in its entirety as a microprocessor, which is programmed to implement the methodology of the invention.

As mentioned above, in addition to incorporation within a switching center 115 (or 105), such a first apparatus 200 may be distributed among a switching center 115 or 105 and an adjunct network entity 120. For example, the first apparatus 200 may be distributed among an MSC 115 and an adjunct network entity 120, with the memory 220 incorporated within the adjunct network entity 120 (such as an HLR 150 or other database), with the processor 210 having components within either or both the MSC 115 and the adjunct network entity 120, and with the network interface 215 incorporated within the MSC 115. Numerous other variations and equivalent embodiments will be readily apparent are also within the scope of the present invention.

Figure 3:
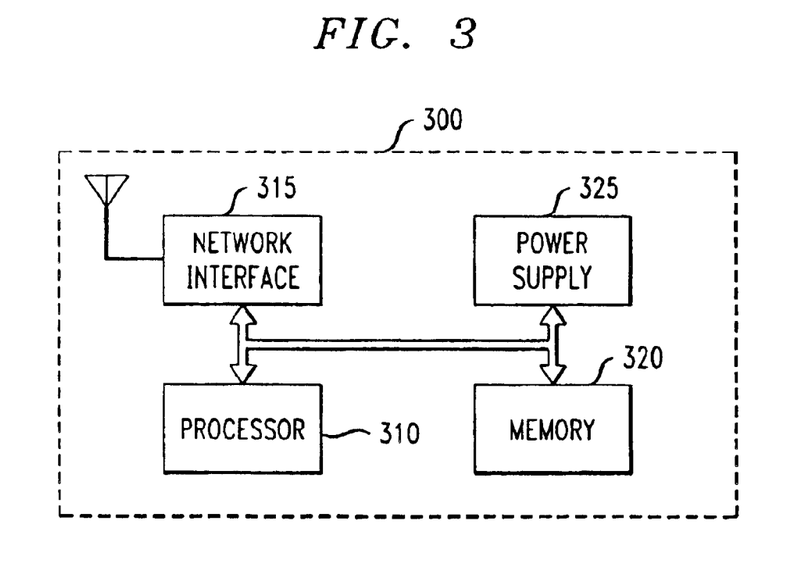
FIG. 3 is a block diagram illustrating a second apparatus embodiment to provide for detection and recovery of missing wireless devices in communication systems in accordance with the present invention.

FIG. 3 is a block diagram illustrating a second apparatus embodiment 300 to provide for detection and recovery of missing wireless devices in communication systems in accordance with the present invention. Such a second apparatus 300 preferably may be included within a mobile unit 130, to perform recovery mode functions (also as discussed above with reference to FIG. 1 and discussed further below with reference to FIG. 4).

Referring to FIG. 2, the second apparatus 200 also includes a processor 310, a network interface 315, a memory 320, and further includes a power supply 325. The network interface 315 is utilized to receive and transmit data, such as a recovery page, a recovery signal, the recovery identification and the recovery channel information, voice information, control messages, and other pertinent information and messages, and also may be utilized to receive incoming call legs and transmit outgoing call legs. As the second apparatus 300 is included preferably within a mobile unit 130, the network interface 315 is typically coupled to or includes an antenna. The memory 320 is preferably one or more integrated circuits (such as various forms of RAM), but also may be a magnetic hard drive, an optical storage device, or any other type of data storage apparatus suitable for a portable or mobile device. The memory 320 is used to store information pertaining to a recovery page, a recovery signal, the recovery identification and the recovery channel information, and also program instructions or configurations (discussed below). Depending upon the implementation of the mobile unit 130, such as a cellular telephone or a PDA, the memory 320 is also used to store information such as call management and other call information, user data (such as address lists, calendars), and any other user information, such as business data and other confidential information.

The second apparatus 300 also includes a power supply 325. In the preferred embodiment, the power supply 325 is preferably implemented as a battery, and is in addition to any battery or other power supply providing power to the mobile unit 130. In addition, in the preferred embodiment, to avoid potential interference with the recovery mode of the present invention, the power supply 325 is implemented to be effectively non-removable (without destruction or other effective disabling of the missing mobile unit 130), to provide power during the recovery mode and the recovery sleep modes independently of any other power supply of the mobile unit 130 (which typically may be removable and replaceable).

Figure 4:
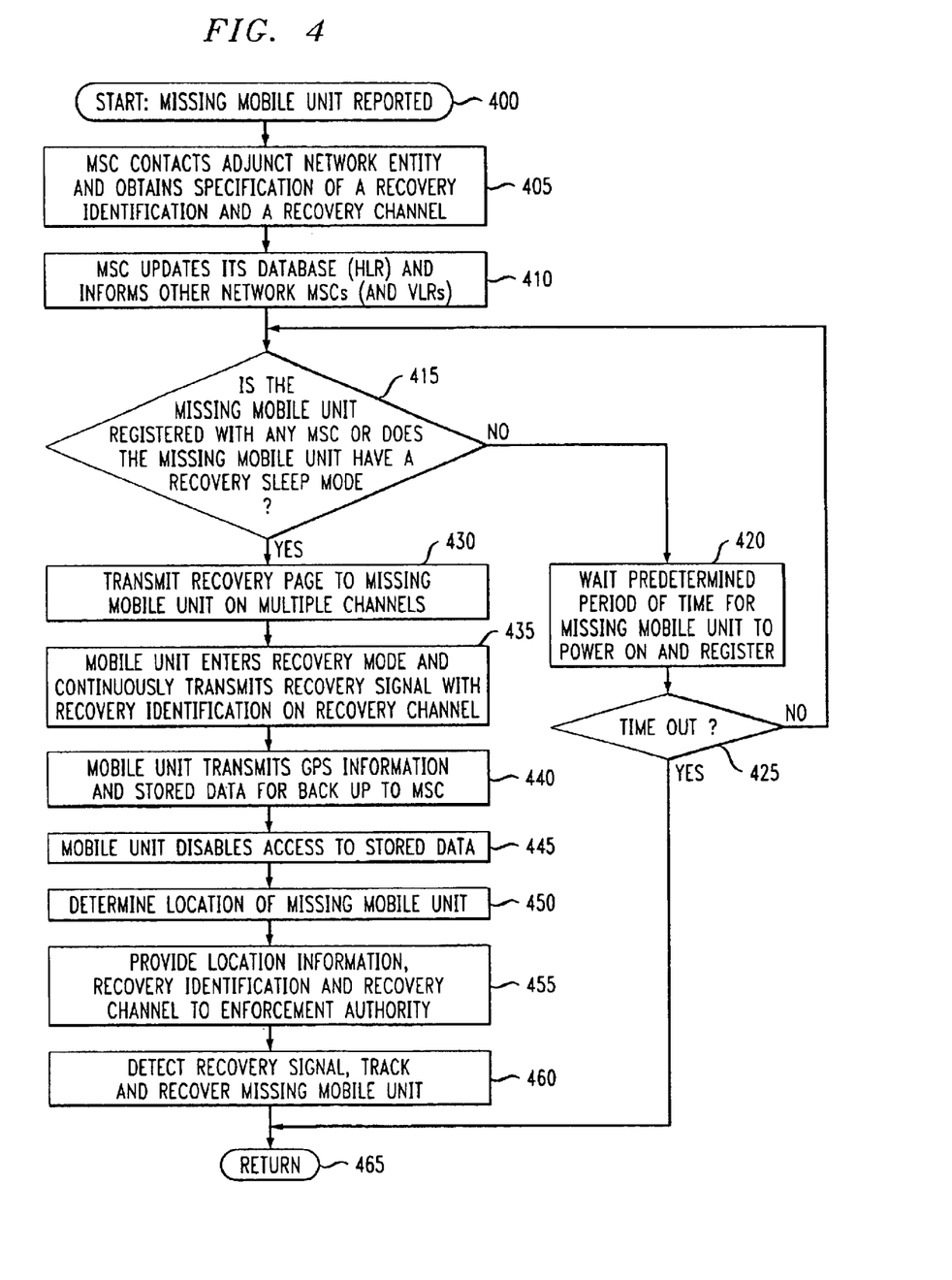
FIG. 4 is a flow diagram illustrating a method embodiment to provide for detection and recovery of missing wireless devices in communication systems in accordance with the present invention.

Continuing to refer to FIG. 3, the processor 310, as previously defined above, also may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), other ICs and components, or some other grouping of integrated circuits which perform the functions discussed above with reference to FIG. 1, and also discussed in detail below with reference to FIG. 4, with associated memory, such as microprocessor memory or additional RAM, DRAM, SRAM, MRAM, ROM, EPROM or $E^2$PROM. The processor 310 with its associated memory also may be configured (via programming or hard-wiring) to perform the methodology of the invention, as discussed above with reference to FIG. 1 and as discussed below with reference to FIG. 4. For example, the methodology may be programmed and stored, in the processor 310 with its associated memory (and/or memory 320) and other equivalent components, as a set of program instructions (or equivalent configuration or other program) for subsequent execution when the processor 210 is operative (i.e., functioning in recovery sleep mode or when powered on). Equivalently, when the processor 310 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 310 is implemented in its entirety as a microprocessor, which is programmed to implement the methodology of the invention.

Numerous other variations and equivalent embodiments of the second apparatus 300 will be readily apparent are also within the scope of the present invention.

FIG. 4 is a flow diagram illustrating a method embodiment to provide for detection and recovery of missing wireless devices in communication systems in accordance with the present invention, and provides a useful summary of the present invention. The method begins, start step 400, with a report of a lost, stolen, or otherwise missing mobile unit 130. An MSC 115 (or wireline switching center 105) then contacts the detection and recovery application 125 within adjunct network entity 120, preferably through transmission of an appropriate message, and obtains (through an appropriate response message) a specified recovery identification and recovery channel, for use in the recovery page, step 405. The MSC 115 (or wireline switching center 105) then updates its database (e.g., HLR) and informs other network MSCS 115, which also update their corresponding databases (e.g., HLRs and/or VLRs), step 410. The various MSCs 115 then determine whether the missing mobile unit 130 is either registered with any of the various MSCs 115 or has a recovery sleep mode, step 415. When the missing mobile unit is not registered with any of the various MSCs 115 and does not have a recovery sleep mode in step 415, the MSCs wait a predetermined period of time for the missing mobile unit 130 to power on and register, step 420 (with iterative returning to step 415, upon expiration of the predetermined period of time, to determine if the missing mobile unit 130 has powered on and registered during the previous interval). (If the mobile unit 130 has not powered on and registered within a second predetermined period of time, the method may time out and end, step 425). When the missing mobile unit 130 is or has registered with one of the various MSCs 115 or does have a recovery sleep mode in step 415, the method proceeds to step 430.

In step 430, the MSC 115 serving the geographic region of a registered missing mobile unit 130 transmits, or one or more MSCs 115 which potentially may serve a geographic region having a missing mobile unit 130 with a recovery sleep mode transmit, via one or more base stations 145, a recovery page to the missing mobile unit 130, preferably on multiple channels, with the recovery page including information specifying the recovery identification and the recovery channel previously specified for the particular missing mobile unit 130 by the detection and recovery application 125A. Upon reception of a recovery page transmitted from any of the MSCs 115 through a base station 145, the missing mobile unit 130 enters recovery mode and:transmits a recovery signal on the specified recovery channel and containing the recovery identification, step 435. Depending upon the chosen embodiment, the missing mobile unit may also transmit GPS information to its serving MSC 115, and may also transmit stored data to the serving MSC 115 for back up in a database or other information storage device, step 440. Next, in step 445, the missing mobile unit 130 disables access to any stored data, such as by encrypting the data, requiring a predesignated password to access the data, or by destroying the data (such as by deleting all stored data).

Continuing to refer to FIG. 4, the serving MSC 115 determines the (approximate) location of the missing mobile unit 130, such as through GPS information, through location of the missing mobile unit 130 within a particular serving region of a base station 145, or through more sophisticated triangulation techniques of multiple base stations 145, step 450, and notifies the detection and recovery application 125A and/or the enforcement authority 170 of the current location, the recovery identification and recovery channel of the missing mobile unit 130, step 455. As the location of the missing mobile unit 130 may change over time, steps 440, 450 and 455 may be repeated. Depending upon the chosen embodiment, the detection and recovery application 125A, by itself or through an MSC 115, may also notify the enforcement authority of the recovery identification and recovery channel of the missing mobile unit 130. The enforcement authority 170, having been given information pertaining to an approximate current location, the recovery identification, and the recovery channel of the recovery signal of the missing mobile unit 130, may detect the recovery signal, and track and recover the missing mobile unit 130 (through mobile enforcement 175), step 460, and the method may end, step 465.

Numerous advantages of the present invention may be apparent from the discussion above. In accordance with the present invention, apparatus, method and system embodiments are provided for the detection and recovery of lost, stolen or otherwise missing mobile or wireless communication devices. The various embodiments of the present invention are cost-effective, capable of implementation within current communication systems, and provide an effective deterrent to the illicit use of such lost, stolen or otherwise missing wireless devices. In addition, the apparatuses, method and system of the present invention have the capability to recover data stored in mobile or wireless communication devices, and to disable illicit access to such stored data.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method of detecting and recovering a mobile unit, the method comprising:
  (a) determining a recovery identification and a recovery channel;
  (b) transmitting a recovery page to the mobile unit, the recovery page including information specifying the recovery identification and the recovery channel;
  (c) in response to the recovery page, entering a recovery mode and transmitting a recovery signal from the mobile unit on the recovery channel, the recovery signal including the recovery identification; and
  (d) utilizing the recovery signal, locating the mobile unit.

2. The method of claim 1, further comprising:
  (e) recovering the mobile unit.

3. The method of claim 1, wherein step (c) further comprises:
  disabling access to data stored in the mobile unit.

4. The method of claim 1, wherein step (c) further comprises:
  deleting data stored in the mobile unit.

5. The method of claim 1, wherein step (c) further comprises:
  transmitting data stored in the mobile unit for back up storage in a predetermined location; and
  disabling access to the data stored in the mobile unit.

6. The method of claim 1, wherein step (c) further comprises:
  transmitting global positioning system information of the mobile unit.

7. The method of claim 1, wherein step (c) further comprises:
  disabling non-recovery mode functionality of the mobile unit.

8. The method of claim 1, wherein step (b) further comprises:
  transmitting the recovery page from a plurality of mobile switching centers through a plurality of base stations to the mobile unit having a recovery sleep mode.

9. The method of claim 1, wherein step (b) further comprises:
  transmitting the recovery page from a serving mobile switching center, through a base station, to the mobile unit which has registered within a geographic region served by the base station.

10. The method of claim 1, wherein step (b) further, comprises:

transmitting information specifying the recovery identification and the recovery channel to an enforcement authority for detection and tracking of the recovery signal.

11. The method of claim 1, further comprising:
providing an independent source of power for the recovery mode of the mobile unit.

12. The method of claim 1, wherein the recovery page is distinctive from any other signal of a first plurality of signals transmitted to the mobile unit and wherein the recovery signal is distinctive from any other signal of a second plurality of signals transmitted from the mobile unit.

13. A system for detecting and recovering a mobile unit, the system comprising:
an adjunct network entity having a detection and recovery application for determining a recovery identification and a recovery channel;
a base station for wireless communication with the mobile unit;
a mobile switching center coupled to the adjunct network entity and to the base station, the mobile switching center operative to transmit a recovery page to the mobile unit via the base station, the recovery page including information, specifying the recovery identification and the recovery channel;
the mobile unit responsive to a recovery page to enter a recovery mode and transmit a recovery signal on the recovery channel, the recovery signal including the recovery identification; and
means to locate the mobile unit utilizing the recovery signal.

14. The system of claim 13, further comprising:
means to recover the mobile unit.

15. The system of claim 14, wherein the means to recover the mobile unit include a mobile enforcement authority.

16. The system of claim 13, wherein the means to locate the mobile unit include a mobile receiver for reception and tracking of the recovery signal.

17. The system of claim 13, wherein the mobile unit is further responsive in the recovery mode to disable access to data stored in the mobile unit.

18. The system of claim 13, wherein the mobile unit is further responsive in the recovery mode to delete data stored in the mobile unit.

19. The system of claim 13, wherein the mobile unit is further responsive in the recovery mode to transmit data stored in the mobile unit to the mobile switching center for back up storage in a predetermined location and to disable access to the data stored in the mobile unit.

20. The system of claim 13, wherein the mobile unit is further responsive in the recovery mode to transmit global positioning system information to the mobile switching center.

21. The system of claim 13, wherein the mobile unit is further responsive in the recovery mode to disable non-recovery mode functionality.

22. The system of claim 13, wherein the mobile unit has a recovery sleep mode when powered off and wherein the system further comprises a plurality of mobile switching centers to transmit a plurality of recovery pages through a plurality of base stations.

23. The system of claim 13, wherein the mobile switching center is further operative to transmit information specifying the recovery identification and the recovery channel to an enforcement authority for detection and tracking of the recovery signal.

24. The system of claim 13, wherein the mobile unit has an independent source of power for the recovery mode of the mobile unit.

25. The system of claim 13, wherein the recovery page is distinctive from any other signal of a first plurality of signals transmitted to the mobile unit and wherein the recovery signal is distinctive from any other signal of a second plurality of signals transmitted from the mobile unit.

26. An apparatus for detecting and recovering a mobile unit, the apparatus comprising:
a network interface for communication with the mobile unit;
a memory; and
a processor coupled to the network interface and to the memory, the processor, when operative, configured to transmit a recovery page to the mobile unit via the network interface, the recovery page including information specifying a recovery identification and a recovery channel; the processor further configured to detect via the network interface a recovery signal transmitted from the mobile unit on the recovery channel, the recovery signal including the recovery identification, and the processor further configured to locate the mobile unit utilizing the recovery signal.

27. The apparatus of claim 26, wherein the processor is further configured to locate the mobile unit through global positioning system information included within the recovery signal.

28. The apparatus of claim 26, wherein the processor is further configured to locate the mobile unit within a geographic region served by a base station receiving the recovery signal.

29. An apparatus for providing detection and recovery of a mobile unit, the mobile unit operative for wireless communication with a switching center via a base station, the apparatus comprising:
a network interface for reception of a recovery page and for transmission of a recovery signal;
a memory; and
a processor coupled to the network interface and to the memory, the processor, when operative, configured, in response to reception of the recovery page, the recovery page including specification of a recovery identification and a recovery channel, to enter a recovery mode and transmit a recovery signal on the recovery channel, the recovery signal including the recovery identification.

30. The apparatus of claim 29, wherein the processor is further configured in the recovery mode to disable access to data stored in the memory.

31. The apparatus of claim 29, wherein the processor is further configured in the recovery mode to delete data stored in the memory.

32. The apparatus of claim 29, wherein the processor is further configured in the recovery mode to transmit data stored in the memory to the mobile switching center for back up storage in a predetermined location and to disable access to the data stored in the memory.

33. The apparatus of claim 29, wherein the processor is further configured in the recovery mode to determine global positioning system information and to transmit the global positioning system information in the recovery signal.

34. The apparatus of claim 29, wherein the processor is further configured in the recovery mode to disable non-recovery mode functionality.

35. The apparatus of claim 29, further comprising:
a power supply coupled to the processor, the memory and the network interface, the power supply independent from any source of power to the mobile unit, wherein the processor has a recovery sleep mode for reception of the recovery page and transmission of the recovery signal when the mobile unit is powered off.

36. The apparatus of claim 29, wherein the apparatus is embodied within a mobile telephone.

37. The apparatus of claim 29, wherein the apparatus is embodied within a personal digital assistant.

38. The apparatus of claim 29, wherein the apparatus is embodied within a computer.

* * * * *